US007003100B2

(12) United States Patent
Lai et al.

(10) Patent No.: US 7,003,100 B2
(45) Date of Patent: Feb. 21, 2006

(54) MODEM WITH ENHANCED ECHO CANCELER

(75) Inventors: Yhean-Sen Lai, Warren, NJ (US); Kannan Rajamani, Edison, NJ (US)

(73) Assignee: Agere Systems Inc., Allentown, PA (US)

( * ) Notice: Subject to any disclaimer, the term of this patent is extended or adjusted under 35 U.S.C. 154(b) by 804 days.

(21) Appl. No.: 10/016,549

(22) Filed: Dec. 10, 2001

(65) Prior Publication Data

US 2003/0108094 A1 Jun. 12, 2003

(51) Int. Cl.

*H04M 1/00* (2006.01)
*H04M 9/00* (2006.01)
*H04M 9/08* (2006.01)

(52) U.S. Cl. ................................ 379/406.1; 379/406.06

(58) Field of Classification Search ....................... 379/406.01–406.16; 370/286, 287; 375/220, 375/222

See application file for complete search history.

(56) References Cited

U.S. PATENT DOCUMENTS

| | | | | |
|---|---|---|---|---|
| 5,307,405 A * | 4/1994 | Sih | ....................... | 379/406.08 |
| 5,828,657 A * | 10/1998 | Betts et al. | ................. | 370/289 |
| 6,240,128 B1 | 5/2001 | Banerjea et al. | ............ | 375/222 |

OTHER PUBLICATIONS

Richard C. Younce, Peter JW Melsa, Samie Kapoor, Echo Canceller for Asymmetrical Digital Subscriber Lines, 1994, IEEE, ICC 94, SUPERCOMM/ICC '94, Conference Record, Serving Humanity Through Communications. IEEE International Conference,pp.: 301-306.*

J. Cioffi and J. Bingham, "A Data Multitone Echo Canceller", IEEE Transaction on Communications, vol. 42, No. 10, Oct. 1994, pp. 2853-2869.

M. Schlegel, Technical Educational Institute of Piraeus, Department of Electronics, High Bit Rate Data Transmission over the Telephone loop plant—Emphasis on DMT Modulation Scheme (Diploma Thesis), Chapter 6, [online], [retrieved on Jul. 16, 2001], retrieved form the Internet :<URL: http:/www.fh-lippe.del~wayne1/chapter6.html.

* cited by examiner

*Primary Examiner*—Curtis Kuntz
*Assistant Examiner*—Alexander Jamal
(74) *Attorney, Agent, or Firm*—Synnestvedt Lechner & Woodbridge LLP

(57) ABSTRACT

A modem incorporating apparatus and methods to achieve computationally efficient echo cancellation. The apparatus include a cyclic echo synthesizer sub-canceler in the time domain and a echo canceler in the frequency domain. The method includes generating a cyclic echo synthesizer signal using a sub-canceler structure, adding the cyclic echo synthesizer signal to a receive signal in the time domain, generating an echo cancellation signal, and subtracting the echo cancellation signal from the receive signal in the frequency domain. The apparatus and methods may be used for echo cancellation in an asynchronous digital subscriber line (ADSL) modem using discrete multi-tone (DMT) technology.

12 Claims, 2 Drawing Sheets

MODEM WITH ENHANCED ECHO CANCELER

FIELD OF THE INVENTION

The present invention relates to telecommunications and, more particularly, to echo cancellation in telecommunication modems.

BACKGROUND OF THE INVENTION

Modems are telecommunication devices used to transfer information between a first digital device, e.g., a computer, and a communication medium, such as a twisted pair telephone line (referred to hereinafter as a "twisted pair"), for communication with a second device at a telephone company central office (TCCO), for example. Typically, modem modems are capable of transmitting a transmit signal and receiving a receive signal from the TCCO over the same twisted pair telephone line simultaneously, i.e., full-duplex data transmission. To cancel any echoes of the transmit signal that may return over the twisted pair telephone line and interfere with the receive signal, an echo canceler is used to create an echo cancellation signal that is subtracted from the receive signal. Echo cancellation is necessary to increase data transmission rates and improve overall performance.

One system for communicating over a twisted pair incorporates asymmetric digital subscriber lines (ADSL). ADSL systems can provide very high data speeds, such as on the order of several megabits per second, over a standard twisted pair. Unlike the traditional data modems used for analog communication with a TCCO via a twisted pair, ADSL requires modems both at the subscriber end and at the TCCO end. Current ADSL systems employ discrete multitone (DMT) technology to implement high bandwidth communications, such as for digital TV broadcast, on demand video, high speed video-based internet access, work at home digital file transfer, teleconferencing, home shopping, and other information services over existing twisted pair telephone lines.

Several DMT standards have been promulgated. For instance, the International Telecommunications Union (ITU) has promulgated a standard for ADSL that is commonly termed G.lite and which is set forth in ITU-T specification G.992.2, incorporated herein by reference. Another standard, promulgated by ANSI, is commonly termed Heavy ADSL and is set forth in ANSI specification T1.413, issue 2, also incorporated herein by reference. In DMT communications, data is sent in frames. A frame is comprised of a plurality of samples, each frame including data samples and cyclic prefix samples. Data samples comprise most of the frame and the collection of data samples in a single frame comprise one DMT symbol. The cyclic prefix comprises samples that are added at the beginning of each frame such that the cyclic prefix samples are between the DMT symbols in the data stream. The purpose of the cyclic prefix is to help avoid inter-symbol interference (ISI). The frame and cyclic prefix is of a standardized length. For example, in heavy ADSL, each symbol comprises 512 samples with 256 tones (32 tones for upstream communications), each tone having a real and an imaginary portion. Heavy ADSL utilizes a cyclic prefix of length L=32 samples. Accordingly, a frame has 544 samples.

FIG. 1 is a block diagram of the basic ADSL modem functions, as would be well known to those of skill in the art.

The upper half of the diagram represents functions in the transmit direction while the lower half represents functions in the receive direction.

It should be noted that FIG. 1 is a functional block diagram and that the blocks shown therein do not necessarily correspond to separate physical circuits. In fact, most if not all of the functions will be performed by one or more digital processors (DP) 100 such as, but not limited to, a digital signal processor, a micro processor, a programmed general purpose computer, etc. It also is possible that part or all of the functions of some of the blocks may be implemented by analog circuitry.

In the transmit direction, digital data is generated, scrambled, and encoded by a transmit encoder 102. Digital data for transmission is generated by the digital processor (DP) via a transmitter 104. The digital data is passed from the transmitter 104 to a scrambler 106 that scrambles the data for transmission. The data is then processed through a forward error correction (FEC) encoder 108 which adds syndrome bytes to the data. The syndrome bytes will be used for error correction by a receiver at the TCCO 110. Next, a quadrature amplitude modulation (QAM) encoder 112 encodes the transmit data using quadrature amplitude modulation.

The scrambled and encoded data is then converted from the frequency domain to the time domain via an Inverse Fast Fourier Transform (IFFT) 114. An interpolator 116 interpolates the output of the IFFT 114. For example, if the interpolator 116 is a 1:4 interpolator and the IFFT 114 produces 128 samples, the interpolator produces 512 samples from the 128 samples output from the IFFT 114. A cyclic prefix is added to each frame by a cyclic prefix adder 118, e.g., 32 samples. The data is then converted from digital to analog by a coder/decoder for transmission over the twisted pair 122 to the TCCO 110 via a hybrid circuit 124.

In the receive direction, a receive signal is passed from the twisted pair 122 to the CODEC 120 via the hybrid circuit 124. The CODEC 120 converts the receive signal from analog to digital and passes it to a time domain equalizer (TDQ) 126 to shorten the channel impulse response. Then, the cyclic prefix is removed by a cyclic prefix subtractor 128.

An echo canceler (EC) 132 is coupled between the transmit path and the receive path to create an echo cancellation signal based on the transmit signal. Using an algebraic combining unit 134, the echo cancellation signal is subtracted from the receive signal to cancel any echo of the transmit signal that could interfere with the receive signal.

The echo compensated signal is converted to the frequency domain by a fast Fourier transform (FFT) 136. The receive signal out of the FFT 136, which now has had the cyclic prefix removed and has been converted to the frequency domain is sent to the frequency domain equalizer (FDQ) 130 to compensate for channel distortion in the receive signal.

The receive signal is then decoded by a receive decoder 138 to generate a data signal for processing by the DP 100. The receive signal is processed through a QAM decoder 140. That is followed by an FEC decoder 142, which uses the syndrome bits that were added by a transmit path FEC encoder at the TCCO 110 to perform forward error correction. Finally, the data is descrambled by a descrambler 144 to extract a data signal that is forwarded to the DP 100 for processing via a receiver 146.

The output of the FFT 136 also is sent to a timing recovery circuit 148 that controls the CODEC 120 to synchronize the CODEC 120 to the timing of the data received from the TCCO 110. Essentially, the timing recovery process is a feedback process in which timing pilot tones are detected and used to continuously adjust the CODEC timing so as to sample the received data at the appropriate sampling points.

Echo cancellation using a time domain echo canceler is computationally expensive. The computations performed by the time domain echo canceler require a great deal of processing by the DP 100, which uses processing power that could be utilized for other tasks. Accordingly, there is a need for apparatus and devices capable of echo cancellation that are more efficient, thereby freeing processing power for performing other tasks. The present invention fulfills this need among others.

SUMMARY OF THE INVENTION

The present invention provides for computationally efficient apparatus and methods to cancel echoes in a telecommunication modem. The echo cancellation apparatus and methods overcome the aforementioned problems through the use of a cyclic echo synthesizer sub-canceler in the time domain and an echo canceler in the frequency domain. The cyclic echo synthesizer sub-canceler makes the receive echo signal appear periodic. The echo canceler is then used to cancel transmit signal echoes in the receive signal as modified by the cyclic echo synthesizer.

One aspect of the present invention is a modem having a transmit path carrying a transmit signal, a receive path carrying a receive signal, and an echo canceler, the transmit path including an inverse fast Fourier transform (IFFT) for converting the transmit signal from the frequency domain to the time domain and the receive path including a fast Fourier transform (FFT) for converting the receive signal from the time domain to the frequency domain. The echo canceler includes a cyclic echo synthesizer sub-canceler (CESS) having an input for receiving the transmit signal in the time domain and further having an output for producing a cyclic echo signal; a first algebraic combining unit for adding the cyclic echo signal to the receive signal in the time domain; an echo canceler having an input for receiving the transmit signal in the frequency domain, an adaptive input for receiving an adaptive signal, and an output for producing an echo cancellation signal based on the transmit signal and the adaptive signal; a second algebraic combining unit for subtracting the echo cancellation signal from the receive signal in the frequency domain to produce a resultant signal at an output; and a frequency domain equalizer having an input coupled to the output of the second algebraic combining unit for receiving the resultant signal, the frequency domain equalizer producing the adaptive signal.

Another aspect of the invention is an echo cancellation method for use in a modem, the modem for establishing communication between a first device and a second device via a communication medium, the modem passing a transmit signal generated by the first device via a transmit encoder to the communication medium and passing a receive signal from the communication medium to the first device via a receive decoder. The modem includes an inverse fast Fourier transform for converting the transmit signal from the frequency domain to the time domain and a fast Fourier transform for converting the receive signal from the time domain to the frequency domain and is coupled to the communication medium through a hybrid circuit. The echo cancellation method includes generating a cyclic echo signal based on the transmit signal in the time domain using a sub-canceler structure, adding the cyclic echo signal to the receive signal in the time domain, generating an echo cancellation signal based on the transmit signal in the frequency domain and an adaptive signal, subtracting the echo cancellation signal from the receive signal in the frequency domain, and generating the adaptive signal based on the receive signal after subtracting the echo cancellation signal.

DETAILED DESCRIPTION OF THE INVENTION

Figure 1:
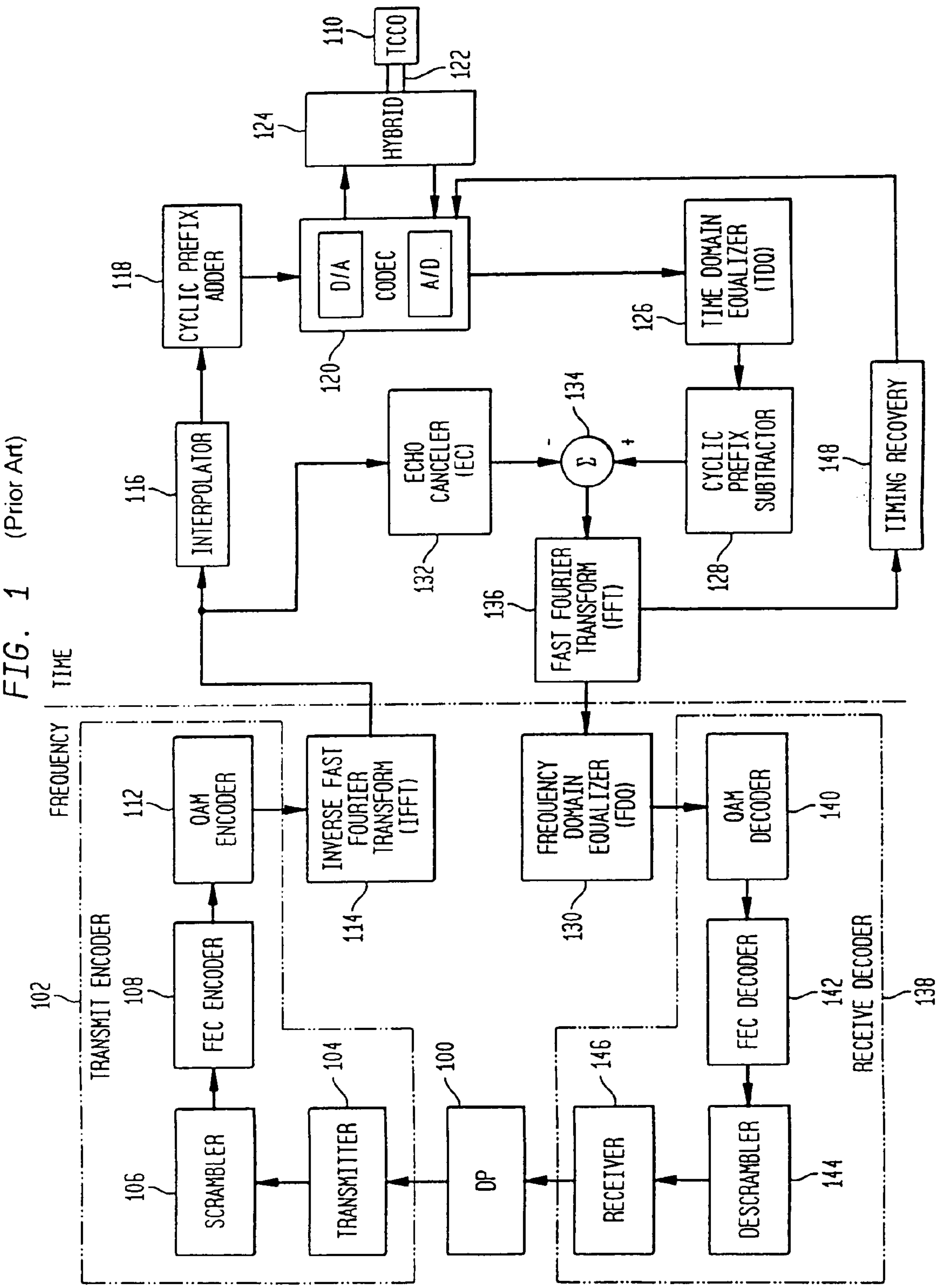
FIG. 1 is a block diagram of a prior art modem with echo cancellation.
Figure 2:
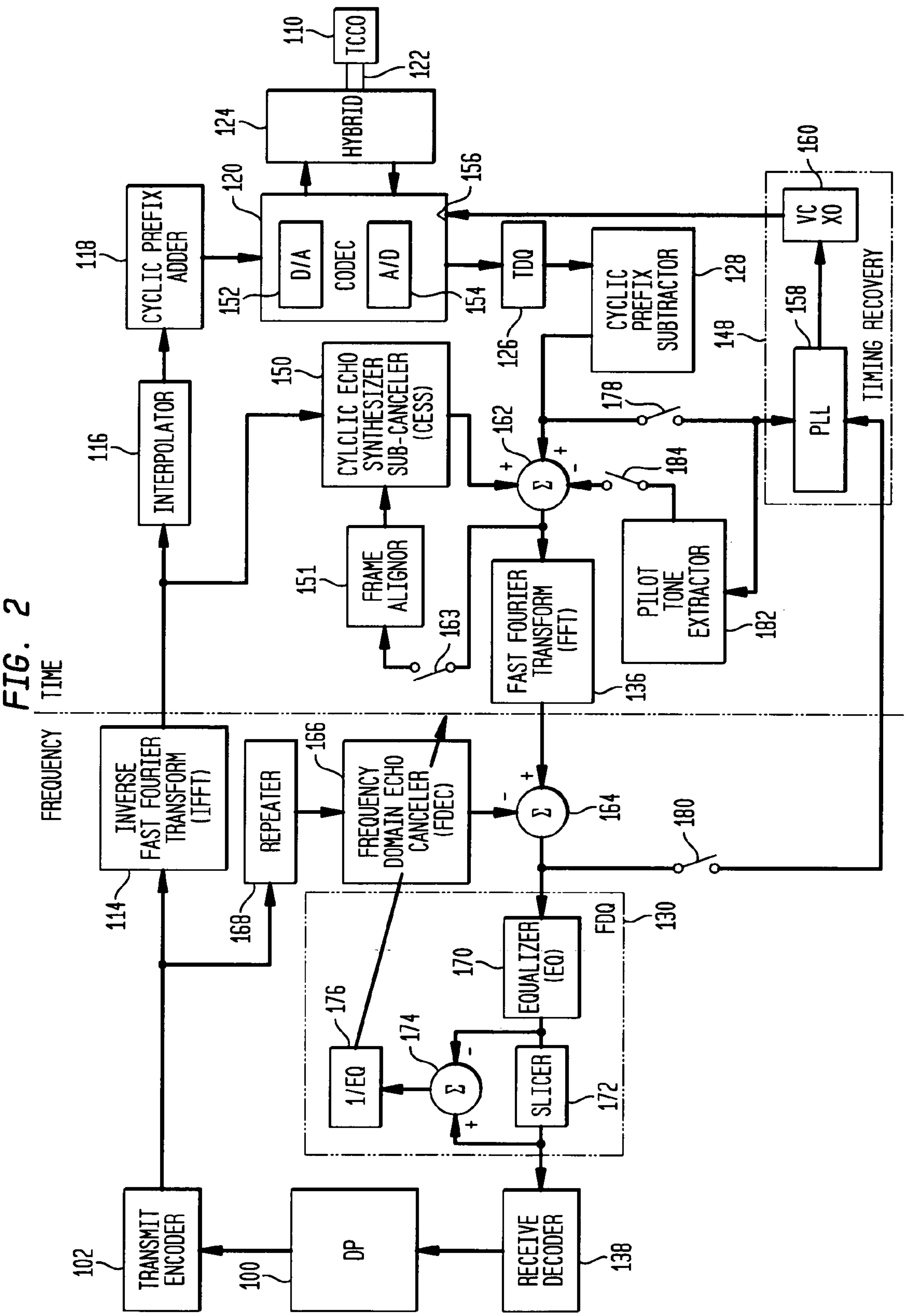
FIG. 2 is a block diagram of a modem incorporating efficient echo cancellation in accordance with the present invention.

FIG. 2 is a block diagram of a modem incorporating a computationally efficient echo cancellation structure for establishing communication between a first device, e.g., a digital processor (DP) 100, and a second device, e.g., a device at a TCCO 110, via a communication medium such as a twisted pair telephone line 122. In a general overview, a transmit signal based on a data stream developed by the DP 100 is passed through a transmit encoder 102, an IFFT 114, an interpolator 116, a cyclic prefix adder 118, a CODEC 120, and a hybrid circuit 124 for transmission over the twisted pair 122 to the TCCO 110. A receive signal received from the TCCO 110 over the twisted pair 122 is passed through the hybrid circuit 124, the CODEC 120, a cyclic prefix subtractor 128, a fast Fourier transform (FFT) 136, a FDQ 130, and a receive decoder 138 to yield a data stream for processing by the DP 100. Echoes of the transmit signal on the receive signal are removed through the use of a computationally efficient combination of a cyclic echo synthesizer sub-canceler (CESS) 150 in the time domain and a frequency domain echo canceler (FDEC) 166 in the frequency domain.

FIG. 2 will now be described in detail. A data stream developed by the DP 100 for transmission to the TCCO 110 is supplied to the transmit encoder 102 where it is scrambled and encoded in a known manner to generate a transmit signal that represents an encoded complex version of the data stream. It is understood that the DP 100 may be essentially any device capable of processing signals. The transmit signal out of the transmit encoder 102 is converted from the frequency domain to the time domain by the IFFT 114. The transmit signal after conversion to the time domain is interpolated by the interpolator 116. The interpolator 116 converts the sample rate of the transmit signal to a common sample rate employed by the CODEC 120. It should be noted that in certain applications the sample rate of the transmit signal out of the IFFT 114 is the same as the sample rate of the CODEC 120, thereby eliminating the need for the interpolator 116.

The transmit signal out of the interpolator 116 is converted from digital to analog by a digital-to-analog (D/A) converter 152 and, then, supplied to a hybrid circuit 124. Also, an analog receive signal from a remote modem at the TCCO 100 is supplied via the twisted pair telephone line 122 to the hybrid 124 and, then, to an analog-to-digital (A/D) converter 154 to convert the receive signal from analog to digital. The hybrid circuit 124 is employed to supply the analog version of the transmit signal to a twisted pair telephone line 122 for transmission to a device such as a remote modem at the TCCO 110, and to supply an analog version of the receive signal from the remote modem at the TCCO 110 to the modem depicted in FIG. 2. Hybrid circuits for interconnecting two-wire to four-wire telephone lines and vice versa are well known in the art, as are their problems and limitations regarding transmit signal echoes on receive signals. The D/A converter 152 and the A/D converter 154 may be contained within a single CODEC 120.

The sampling rate of the CODEC 120 is controlled by a clock signal at a clock port 156. In certain embodiments, a clock rate of the clock signal at the clock port 136 is divided several times by one or more dividers to obtain the sampling rate. For example, if the sampling rate is approximately 32 kHz and the clock rate is approximately 2 MHz, the clock rate can be divided by six (6) divide-by-two dividers to obtain the sampling rate of approximately 32 kHz. By controlling a clock signal having a comparatively high rate, precise changes to the sampling rate can be achieved. In one embodiment, the clock rate is controlled by a phase locked loop (PLL) 158 via a known voltage controlled crystal oscillator (VCXO) 160 for timing recovery, which will be described below.

The receive signal from the A/D converter 154 is passed to the TDQ 126 to shorten the channel impulse response in a known manner. Then, the cyclic prefix subtractor 128 removes the cyclic prefix. The receive signal out of the cyclic prefix subtractor 128 is supplied to an additive input of a known algebraic combining unit 162. A cyclic echo signal generated by the CESS 150 is algebraically added to the received signal by the algebraic combining unit 162 such that the resultant receive echo signal appears periodic.

The CESS 150 generates the cyclic echo signal. The CESS 150 is an adaptive transversal filter that receives the transmit signal in the time domain at an input and generates the cyclic echo signal at an output. The coefficients for the taps of the adaptive transversal filter are determined using known training protocol and are not updated after training. The CESS 150 includes an input for receiving a frame alignment signal. Using the frame alignment signal, the CESS 150 aligns frames of the transmit signal with frames of the receive signal having echoes of the transmit frames.

The CESS 150 is implemented using a sub-canceler structure. The coefficients for the taps of the sub-cancelers are trained during a known half-duplex training mode using a least-mean-square (LMS) algorithm and, specifically, during the "hand shaking" period between the modem depicted in FIG. 2 and a remote modem at the TCCO 110. Sub-canceler structures are well known adaptive transversal structures that are computationally efficient and can be easily implemented by the DP 100.

A frame alignor 151 generates the frame alignment signal to align the frames of the transmit signal with the frames of the receive signal having echoes from the corresponding transmit frames. In the illustrated embodiment, the frame alignor 151 is coupled to receive the receive signal in the time domain through a switch 163. In one embodiment, the switch 163 is closed during the training of the CESS 150 to align the transmit frames with the corresponding receive frames and is open thereafter.

The receive signal out of the algebraic combining unit 162 is converted from the time domain to the frequency domain by the FFT 136. The receive signal out of the FFT 136 is supplied to an additive input of a known algebraic combining unit 164. An echo cancellation signal generated by the frequency domain echo canceler 166 is then subtracted from the receive signal by the algebraic combining unit 164.

The FDEC 166 generates the echo cancellation signal. The FDEC 166 is a filter having a single complex tap for each tone that receives the transmit signal in the frequency domain at an input. In addition, the FDEC 166 receives an adaptive signal at an adaptive input from the FDQ 130. The coefficients for the taps of the FDEC 166 are determined using known training protocol and are updated during the operation of the modem by the adaptive signal via the adaptive input. In the illustrated embodiment, a repeater 168 captures each symbol of the transmit signal and repeats the symbols over frequency for use by the FDEC 166. The FDEC 166 then generates the echo cancellation signal for each tone at an output based on the frequency domain transmit signal and the complex tap per tone.

The FDEC 166 is utilized in conjunction with the CESS 150. The CESS 150 is employed in the time domain to effectively make the receive echo signal appear periodic. The FDEC 166 is then employed in the frequency domain to cancel echoes on the receive signal as modified by the CESS 150.

The receive signal out of the algebraic combining unit 164 is equalized in the frequency domain by the FDQ 130, which is employed to reduce intersymbol interference in a well-known manner. The FDQ 130 generates an equalized receive signal for processing by the receive decoder 138 and the adaptive signal for adapting the coefficients of the FDEC 166. In the illustrated embodiment, the FDQ 130 includes a known equalizer (EQ) 170, slicer 172, algebraic combining unit 174, and inverse EQ 176.

The receive signal out of the algebraic combining unit 164 is received by the EQ 170 for equalization using complex coefficients, e.g., a+bj. The equalized receive signal is then supplied to the slicer 172 for "slicing." The slicer 172 is employed in a known manner to compare incoming symbol values to standard symbol values and supply the closest standard symbol value to the current incoming symbol value at an output of the slicer 172. The output from the slicer 172 is supplied to the receive decoder 138 where the standard symbols are demaped and demodulated into encoded data bits, and then the data bits are descrambled and decoded, thereby yielding a data stream for processing by the DP 100.

To develop the adaptive signal, the input to the slicer 172 is subtracted from the output of the slicer 172 by a known algebraic combining unit 174 to obtain a difference signal. The difference signal out of the algebraic combining unit 174 is then passed though an inverse EQ 176 to "undo" the effect of the EQ 170 by multiplying the resultant signal by the inverse of the complex coefficients of the EQ 170. For example, if the coefficients of the EQ 170 are represented by a+bj, the coefficients of the inverse EQ 176 would be represented by 1/(a+bj). The resultant signal out of the inverse EQ 176 is the adaptive signal that is supplied to the adaptive input of the FDEC 166.

The timing of the CODEC 120 is controlled by a timing recovery circuit 148 to achieve timing recovery in the modem of FIG. 2. In the illustrated embodiment, the timing recovery circuit 148 includes the PLL 158 and the VCXO 160. In ADSL systems, a pilot tone, which is specified as tone 64 in a communication data symbol, is used to perform timing recovery. The PLL 158 is configured in a known manner to identify the pilot tone and generate a signal that can be used to control the clock rate of the CODEC 120 through the VCXO 160, thereby controlling the sampling rate of the CODEC 120.

In the illustrated embodiment, a first switch 178 is coupled between the timing recovery circuit 148 and the receive signal in the time domain and a second switch 180 is coupled between the timing recovery circuit 148 and the receive signal in the frequency domain. The first switch 178 couples the timing recovery circuit 148 to the receive signal in the time domain during the training of the CESS 150 for timing recovery. After the training of the CESS 150, the first switch 178 uncouples the timing recovery circuit 148 from the receive signal in the time domain and the second switch 180 couples the timing recovery circuit 148 to the receive signal in the frequency domain for timing recovery.

During the training of the CESS 150, a pilot tone extractor 182 is used to remove the pilot tone from the receive signal. The pilot tone extractor 182 receives at an input the receive signal in the time domain through the first switch 178 and generates at an output a pilot tone extraction signal, which can be used to cancel the effect of the pilot tone in the receive signal. The output of pilot tone extractor 182 is coupled to a subtractive input of the algebraic combining unit 162 through a third switch 184. During training of the CESS 150, the first switch 178 and the third switch 184 are closed, thereby extracting the pilot tone from the receive signal in the time domain for use by the timing recovery circuit 148 and removing the effect of the pilot tone from the receive signal. Thereafter, the first switch 178 and the third switch 184 are open, and the second switch 180 is closed, thereby extracting the pilot tone from the receive signal in the frequency domain for use by the timing recovery circuit 148.

Having thus described a few particular embodiments of the invention, various alterations, modifications, and improvements will readily occur to those skilled in the art. For example, the present application is directed to establishing communication with a device, e.g., a modem, at a TCCO, however, the present invention could be employed to establish communication with devices at essentially any residential or commercial location. In addition, the detailed description focuses on the use of a twisted pair telephone line as the communication medium, however, the present invention may be utilized with other communication mediums such as fiber optic and wireless communication mediums. Such alterations, modifications and improvements as are made obvious by this disclosure are intended to be part of this description though not expressly stated herein, and are intended to be within the spirit and scope of the invention. Accordingly, the description is by way of example only, and not limiting. The invention is limited only as defined in the following claims and equivalents thereto.

What is claimed is:

1. A modem having a transmit path carrying a transmit signal, a receive path carrying a receive signal, and an echo canceler, the transmit path including an inverse fast Fourier transform (IFFT) circuit for converting the transmit signal from the frequency domain to the time domain and the receive path including a fast Fourier transform (FFT) circuit for converting the receive signal from the time domain to the frequency domain, said echo canceler comprising:

a cyclic echo synthesizer sub-canceler (CESS) having an input for receiving the transmit signal in the time domain and further having an output for producing a cyclic echo signal;

a first algebraic combining unit for adding said cyclic echo signal to the receive signal in the time domain;

a frame alignor having an input for coupling to the output of said first algebraic combining unit, said frame alignor producing a frame alignment signal, wherein said CESS further has an adaptive input for receiving said frame alignment signal;

a switch coupled between the input of said frame alignor and the output of said first algebraic combining unit, said switch coupling the input of said frame alignor to the output of said first algebraic combining unit during a training period for frame synchronization of said cyclic echo synthesizer sub-canceler;

an echo canceler having an input for receiving the transmit signal in the frequency domain, an adaptive input for receiving an adaptive signal, and an output for producing an echo cancellation signal based on the transmit signal and said adaptive signal;

a second algebraic combining unit for subtracting said echo cancellation signal from the receive signal in the frequency domain to produce a resultant signal at an output; and a frequency domain equalizer having an input coupled to the output of said second algebraic combining unit for receiving the resultant signal, said frequency domain equalizer producing said adaptive signal.

2. The echo canceler of claim 1, wherein said frequency domain equalizer comprises:

an equalizer having an input coupled to the output of said second algebraic combining unit and further having an output;

a slicer having an input coupled to the output of said equalizer and further having an output;

a third algebraic combining unit for subtracting the input of said slicer from the output of said slicer to produce a difference signal at an output; and an inverse equalizer coupled to the output of said third algebraic combining unit, said inverse equalizer producing said adaptive signal at an output.

3. A modem having a transmit path carrying a transmit signal, a receive path carrying a receive signal, and an echo canceler, the transmit path including an inverse fast Fourier transform (IFFT) circuit for converting the transmit signal from the frequency domain to the time domain and the receive path including a fast Fourier transform (FFT) circuit for converting the receive signal from the time domain to the frequency domain, said echo canceler comprising:

a cyclic echo synthesizer sub-canceler (CESS) having an input for receiving the transmit signal in the time domain and further having an output for producing a cyclic echo signal;

a first algebraic combining unit for adding said cyclic echo signal to the receive signal in the time domain;

an echo canceler having an input for receiving the transmit signal in the frequency domain, an adaptive input for receiving an adaptive signal, and an output for producing an echo cancellation signal based on the transmit signal and said adaptive signal;

a second algebraic combining unit for subtracting said echo cancellation signal from the receive signal in the frequency domain to produce a resultant signal at an output; and a frequency domain equalizer having an input coupled to the output of said second algebraic combining unit for receiving the resultant signal, said frequency domain equalizer producing said adaptive signal;

a pilot tone extractor having an input for receiving the receive signal in the time domain and further having an output for producing a pilot tone cancellation signal to cancel pilot tones within the receive signal;

a first switch coupled to the input of said pilot tone extractor for selectively coupling said pilot tone extractor to the receive signal in the time domain; and a second switch coupled between the output of said pilot tone extractor and the first algebraic combining unit for selectively coupling said pilot tone extractor to a subtractive input of the algebraic combining unit;

wherein during a training period, said first and second switches are closed to cancel said pilot tones within the receive signal in the time domain.

4. The echo canceler of claim 1, further comprising:

a repeater having an input for receiving the transmit signal in the frequency domain and further having an output coupled to the input of said echo canceler.

5. A modem for establishing communication between a first device and a second device via a communication medium, said modem passing data generated by the first device to the communication medium and passing data from the communication medium to the first device, said modem coupled to the communication medium through a hybrid circuit, said modem comprising:

a transmit encoder having an input for receiving data from the first device and an output for passing a transmit signal;

an inverse fast Fourier transform circuit for converting said transmit signal from the frequency domain to the time domain;

a D/A converter having a digital input for receiving said transmit signal in the time domain and further having an analog output for coupling to the hybrid circuit, said D/A converter converting said transmit signal from digital to analog at a sampling rate;

an A/D converter having an analog input for coupling to the hybrid circuit and a digital output, said A/D converter converting a receive signal received from the hybrid circuit from analog to digital, said A/D converter converting said receive signal from analog to digital at said sampling rate;

a cyclic echo synthesizer sub-canceler (CESS) for receiving said transmit signal in the time domain to generate a cyclic echo signal;

a first algebraic combining unit for algebraically adding the cyclic echo signal to said receive signal in the time domain;

a frame alignor having an input for coupling to the output of said first algebraic combining unit, said frame alignor producing a frame alignment signal, wherein said CESS further has an adaptive input for receiving said frame alignment signal;

a switch coupled between the input of said frame alignor and the output of said first algebraic combining unit, said switch coupling the input of said frame alignor to the output of said first algebraic combining unit during a training period for frame synchronization of said cyclic echo synthesizer sub-canceler;

a fast Fourier transform circuit for converting said receive signal from the time domain to the frequency domain;

an echo canceler having an input for receiving said receive signal in the frequency domain, an adaptive input for receiving an adaptive signal, and an output, said echo canceler generating an echo cancellation signal at the output;

a second algebraic combining unit for algebraically subtracting the echo cancellation signal from said receive signal out of said fast Fourier transform;

a frequency domain equalizer for processing said receive signal from said second algebraic combining unit to minimize intersymbol interference in said receive signal at an output, said frequency domain equalizer generating said adaptive signal; and a receive decoder having an input coupled to the output of said frequency domain equalizer for receiving said receive signal and further having an output for coupling to the first device.

6. The modem of claim 5, wherein said frequency domain equalizer comprises:

an equalizer having an input coupled to the output of said second algebraic combining unit and further having an output;

a slicer having an input coupled to the output of said equalizer and further having an output;

a third algebraic combining unit for subtracting the input of said slicer from the output of said slicer to produce a difference signal at an output; and an inverse equalizer coupled to the output of said third algebraic combining unit, said inverse equalizer producing said adaptive signal at an output.

7. A modem for establishing communication between a first device and a second device via a communication medium, said modem passing data generated by the first device to the communication medium and passing data from the communication medium to the first device, said modem coupled to the communication medium through a hybrid circuit, said modem comprising:

a transmit encoder having an input for receiving data from the first device and an output for passing a transmit signal;

an inverse fast Fourier transform circuit for converting said transmit signal from the frequency domain to the time domain;

a D/A converter having a digital input for receiving said transmit signal in the time domain and further having an analog output for coupling to the hybrid circuit, said D/A converter converting said transmit signal from digital to analog at a sampling rate;

an A/D converter having an analog input for coupling to the hybrid circuit and a digital output, said A/D converter converting a receive signal received from the hybrid circuit from analog to digital, said A/D converter converting said receive signal from analog to digital at said sampling rate;

a cyclic echo synthesizer sub-canceler for receiving said transmit signal in the time domain to generate a cyclic echo signal;

a first algebraic combining unit for algebraically adding the cyclic echo signal to said receive signal in the time domain;

a fast Fourier transform circuit for converting said receive signal from the time domain to the frequency domain;

an echo canceler having an input for receiving said receive signal in the frequency domain, an adaptive input for receiving an adaptive signal, and an output, said echo canceler generating an echo cancellation signal at the output;

a second algebraic combining unit for algebraically subtracting the echo cancellation signal from said receive signal out of said fast Fourier transform;

a frequency domain equalizer for processing said receive signal from said second algebraic combining unit to minimize intersymbol interference in said receive signal at an output, said frequency domain equalizer generating said adaptive signal; and a receive decoder having an input coupled to the output of said frequency domain equalizer for receiving said receive signal and further having an output for coupling to the first device;

a pilot tone extractor having an input for receiving the receive signal in the time domain and further having an output for producing a pilot tone cancellation signal to cancel pilot tones within the receive signal;

a first switch coupled to the input of said pilot tone extractor for coupling said pilot tone extractor to the receive signal in the time domain during a training period for training said cyclic echo synthesizer sub-canceler; and a second switch coupled between the output of said pilot tone extractor and the first algebraic combining unit for coupling said pilot tone extractor to a subtractive input of the algebraic combining unit during said training period;

wherein during said training period said first and second switches are closed to cancel said pilot tones within said receive signal in the time domain.

8. The modem of claim 5, further comprising:

a repeater having an input for receiving the transmit signal in the frequency domain and further having an output coupled to the input of said echo canceler.

9. A modem for establishing communication between a first device and a second device via a communication medium, said modem passing data generated by the first device to the communication medium and passing data from the communication medium to the first device, said modem coupled to the communication medium through a hybrid circuit, said modem comprising:

a transmit encoder having an input for receiving data from the first device and an output for passing a transmit signal;

an inverse fast Fourier transform circuit for converting said transmit signal from the frequency domain to the time domain;

a D/A converter having a digital input for receiving said transmit signal in the time domain and further having an analog output for coupling to the hybrid circuit, said D/A converter converting said transmit signal from digital to analog at a sampling rate;

an A/D converter having an analog input for coupling to the hybrid circuit and a digital output, said A/D converter converting a receive signal received from the hybrid circuit from analog to digital, said A/D converter converting said receive signal from analog to digital at said sampling rate;

a cyclic echo synthesizer sub-canceler for receiving said transmit signal in the time domain to generate a cyclic echo signal;

a first algebraic combining unit for algebraically adding the cyclic echo signal to said receive signal in the time domain;

a fast Fourier transform circuit for converting said receive signal from the time domain to the frequency domain;

an echo canceler having an input for receiving said receive signal in the frequency domain, an adaptive input for receiving an adaptive signal, and an output, said echo canceler generating an echo cancellation signal at the output;

a second algebraic combining unit for algebraically subtracting the echo cancellation signal from said receive signal out of said fast Fourier transform;

a frequency domain equalizer for processing said receive signal from said second algebraic combining unit to minimize intersymbol interference in said receive signal at an output, said frequency domain equalizer generating said adaptive signal; and a receive decoder having an input coupled to the output of said frequency domain equalizer for receiving said receive signal and further having an output for coupling to the first device;

a timing adjustment circuit having an input coupled to the output of said first algebraic combining unit and an output for adjusting said sampling rate;

a voltage controlled crystal oscillator having an input and further having an output for adjusting said sampling rate; and a phase locked loop having an input configured to receive said receive signal in the time domain during a training period to train said (CESS) and to receive said receive signal in the frequency domain after said training period, said phase locked loop further having an output coupled to the input of said voltage controlled crystal oscillator.

10. In a modem an echo cancellation method, said modem for establishing communication between a first and a second device via a communication medium, said modem passing a transmit signal generated by the first device via a transmit encoder to the communication medium and passing a receive signal from the communication medium to the first device via a receive decoder, said modem comprising an inverse fast Fourier transform circuit for converting said transmit signal from the frequency domain to the time domain and a fast Fourier transform for converting said receive signal from the time domain to the frequency domain, said modem coupled to the communication medium through a hybrid circuit, said echo cancellation method comprising:

generating a cyclic echo signal based on the transmit signal in the time domain using a sub-canceler structure;

adding said cyclic echo signal to the receive signal in the time domain;

during a training period, switchably coupling the result of said adding step to a frame aligner that aligns frames of the transmit signal with frames of the receive signal having echoes corresponding to the transmit signal;

generating an echo cancellation signal based on the transmit signal in the frequency domain and an adaptive signal;

subtracting said echo cancellation signal from the receive signal in the frequency domain; and generating said adaptive signal based on the receive signal after subtracting said echo cancellation signal.

11. The method of claim 10, further comprising:

extracting a pilot tone from the receive signal during a training period.

12. The method of claim 10, wherein generating said adaptive signal comprises:

equalizing the receive signal in the frequency domain after subtracting said echo cancellation signal;

slicing the equalized receive signal;

subtracting the receive signal prior to slicing from the receive signal after slicing to obtain a difference signal; and inverse equalizing said difference signal to derive said adaptive signal.

* * * * *